United States Patent [19]
Simmons, Jr.

[11] 3,711,920
[45] Jan. 23, 1973

[54] PIPE PULLER AND ALIGNMENT CLAMP

[76] Inventor: Richard L. Simmons, Jr., P. O. Box 740, Wilmington, N.C. 28401

[22] Filed: March 2, 1972

[21] Appl. No.: 231,111

[52] U.S. Cl. ............... 29/200 P, 29/256, 269/43, 269/45
[51] Int. Cl. ................. B23p 19/00, B23p 19/04
[58] Field of Search ......... 29/200 J, 200 P, 256, 272, 29/200 R; 269/43, 45

[56] References Cited

UNITED STATES PATENTS

| | | | |
|---|---|---|---|
| 1,587,689 | 6/1926 | Weiss et al. | 29/256 |
| 2,105,954 | 1/1938 | Rippe | 269/43 |
| 2,108,077 | 2/1938 | Robinson | 269/43 |
| 2,187,878 | 1/1940 | Hill et al. | 269/43 |
| 3,284,883 | 11/1966 | Haverfield et al. | 29/200 P |

Primary Examiner—Thomas H. Eager
Attorney—John W. Malley et al.

[57] ABSTRACT

An apparatus for aligning two pipe sections, for example for welding, having at least two clamp members each attachable to one of the two sections. One of the clamp members is provided with manually adjustable threaded members which contact the section to which it is not attached for axially aligning the two pipe sections. The two clamp members are connected together by a plurality of threaded rods which extend parallel to the axes of the aligned pipe sections and on which nuts can be manually screwed to urge the two pipe sections together. The apparatus can be used on straight, T, and Elbow sections.

4 Claims, 4 Drawing Figures

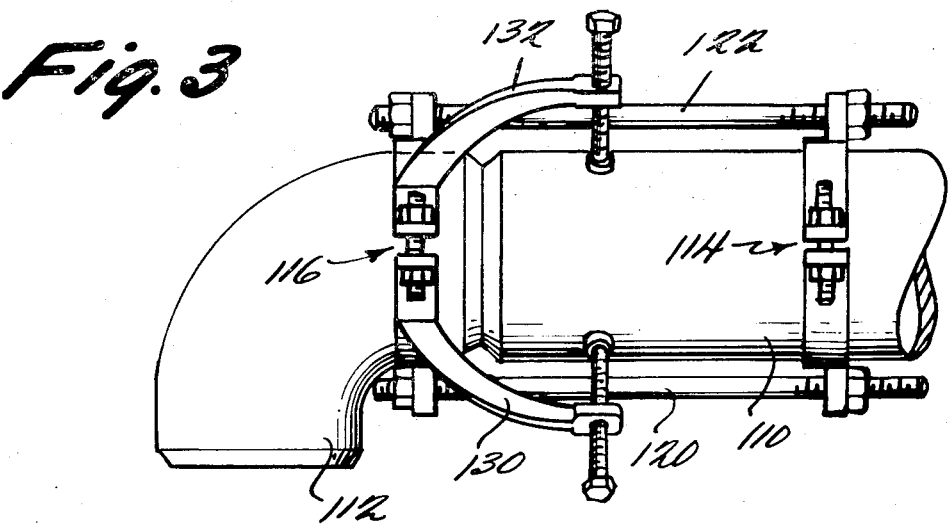
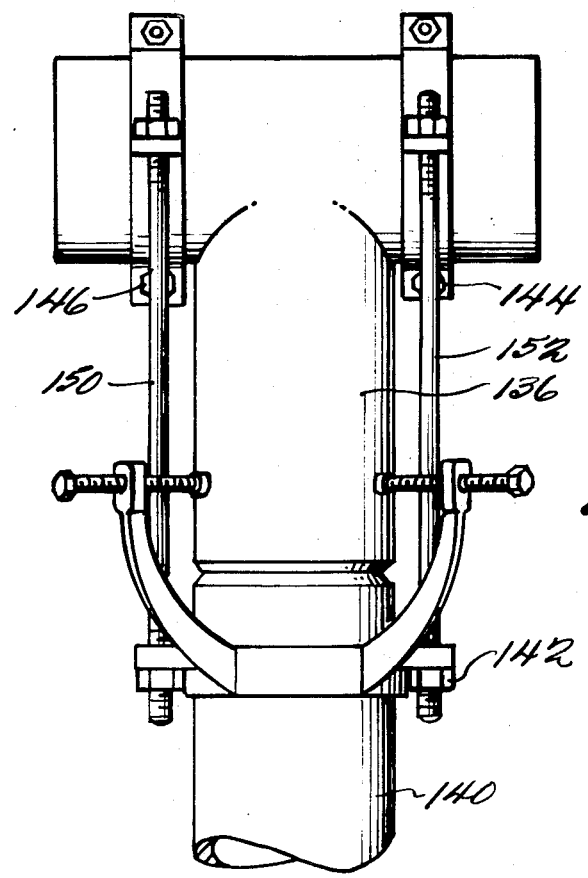

PIPE PULLER AND ALIGNMENT CLAMP

BRIEF DESCRIPTION OF THE PRIOR ART AND SUMMARY OF THE INVENTION

The invention relates to an apparatus for aligning and pulling together two pipe sections.

Pipe sections must be accurately aligned axially and urged toward another while welded together. For many applications, for example, pipes which are used for carrying molten metal in a nuclear reactor, extremely accurate alignment is critical.

In the past, clamping devices of one type or another have been used for holding two pipe sections while they are being welded together. For example, the patent to Robinson U.S. Pat. No. 2,108,077 describes a clamp in which the two pipe sections are held between a V-shaped member and two clamping bolts which can be manually advanced toward the sections. The patent to Hill et al., U.S. Pat. No. 2,187,878, describes a welding jig with two collars each attachable to one of the sections and connected to each other by a number of turnbuckles which can be manually operated to pull the pipe sections toward each other.

The present invention relates to an apparatus by which two pipe sections cannot only be pulled toward each other, but can also be axially aligned very accurately. This is accomplished, according to the invention of this application as described in detail below, by a structure including at least two clamping members or rings each attachable to one of the pipe sections. One of the clamp members is provided with manually adjustable threaded members which contact the section to which it is not attached for axially aligning the two pipe sections. The two clamp members are connected together by a plurality of threaded rods which extend parallel to the axes of the aligned pipe sections and on which nuts can be manually screwed to urge the two pipe sections together. The apparatus can be used on straight, T, and Elbow sections.

Many other objects and purposes of this invention will be clear from the following detailed description of the drawings.

BRIEF DESCRIPTION OF THE DRAWINGS:

FIG. 3, shows a cut-away view of a further embodiment for pulling and aligning a straight and elbow section.

FIG. 4, shows a cut-away view of a further embodiment for pulling and aligning a straight and T section.

DETAILED DESCRIPTION OF THE DRAWINGS

Figure 1:
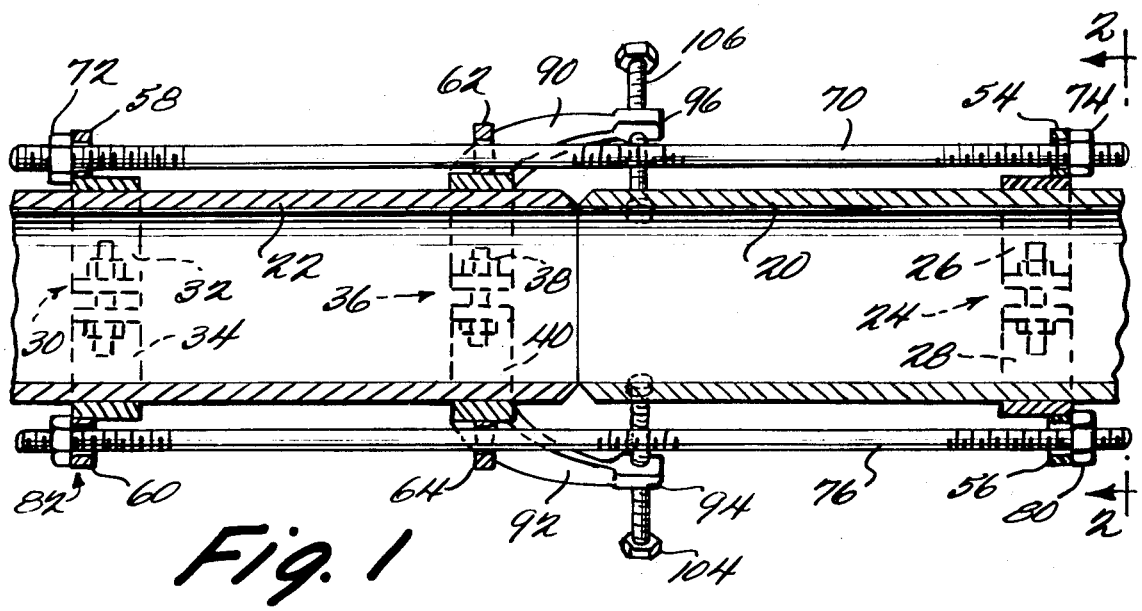
FIG. 1, shows a cut-away view of one embodiment of this invention.
Figure 2:
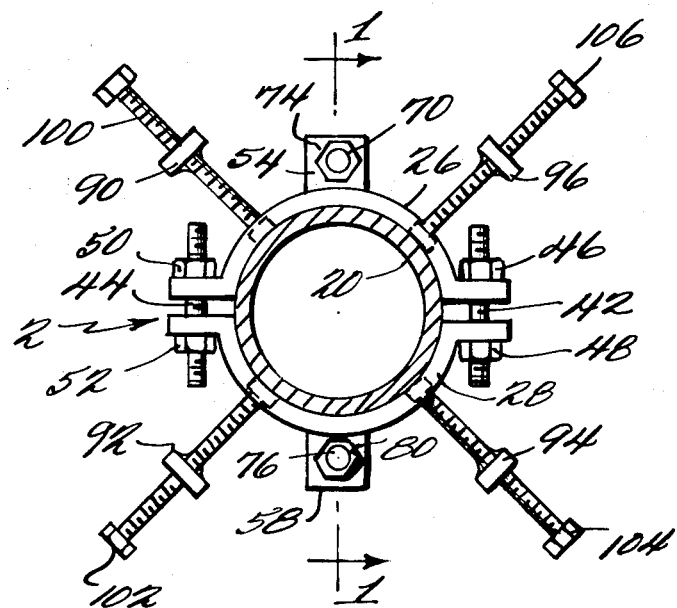
FIG. 2, shows a view of the embodiment of FIG. 1 along the lines 2—2.

Reference is now made to FIGS. 1 and 2 in which the apparatus of this invention is shown in place on straight pipe sections 20 and 22 which are of the type having sharp edges which must be accurately held together for welding. A first clamping member 24, which is comprised of arcuate sections 26 and 28, is attached to pipe section 20. Sections 26 and 28 are conventionally bolted together. A second clamping member 30, also comprised of arcuate sections 32 and 34, is attached to pipe 22. A third clamping member 36, comprised of arcuate members 38 and 40, also is attached to pipe 22. Sections 38 and 40 are coupled together as shown in FIG. 2 by threaded bolts 42 and 44 which have nuts 46, 48, 50 and 52 on the ends thereof for manually clamping member 36 to pipe 36 so that it will not move axially. Members 24 and 30 are similarly attached and removed. Sections 26, 28, 32, 34, 38 and 40 can be made of any suitable material such as cast iron.

Sections 26, 28, 32, 34, 38 and 40 are provided with outwardly extending tabs 54, 56, 58, 60, 62 and 64, respectively with each tab having a passage for slidably receiving a guide rod which is employed for pulling pipe sections 20 and 22 toward each other. Guide rod 70 passes through the passages in tabs 54, 58 and 62 and is threaded on both ends, receiving nuts 72 and 74. Guide rod 76 similarly passes through the passages in tabs 56, 60 and 64 and is threaded on both ends, receiving nuts 80 and 82. Nuts 72, 74, 80 and 82 bear against tabs 58, 54, 56 and 60 respectively. After clamping members 24 and 30 are attached to pipes 20 and 22 respectively, pipes 20 and 22 can be pulled together by manually tightening nuts 72, 74, 80 and 82.

Arms 90, 92, 94 and 96 extend as shown from sections 38 and 40 respectively and each has a threaded passage. Threaded bolts 100, 102, 104 and 106 pass through the passages in arms 90, 92, 94 and 96 respectively to contact the exterior of pipe 20. Bolts 100, 102, 104 and 106 can be easily adjusted manually to align pipes 20 and 22 with extreme accuracy.

While member 30 is helpful in a quick and easy alignment, it can be dispensed with and nuts used to bear against tabs 62 and 64.

Reference is now made to FIG. 3, which illustrates another embodiment for holding and aligning a piece of straight pipe 110 and a piece of elbow pipe 112. Clamping member 114 attaches to pipe 110 in the same manner as the clamping members described above and member 116 to pipe 112. Guide rods 120 and 122 connect together members 114 and 116 in the same fashion that rods 70 and 76 attach together members 24 and 30. Clamping member 116 is provided with a plurality of arms, including arms 130 and 132, with threaded passages through which bolts can be manually moved to align pipes 110 and 112.

FIG. 4 shows an embodiment aligning a T-shaped piece of pipe 136 and a straight piece 140 with clamping member 142 attached to pipe 140 and members 144 and 146 to pipe 136. Guide rods 150 and 152 can be used to pull pipes 136 and 140 together. Member 142 is provided with a plurality of arms through which aligning bolts pass as described above.

Many changes and modifications in the above embodiments of the invention can, of course, be made without departing from the scope of the invention. Accordingly, that scope is intended to be limited only by the scope of the appended claims.

What is claimed is:

1. An apparatus for axially aligning and pulling together two pipe sections comprising:
   first clamp means for attachment to one of said pipe sections,
   second clamp means for attachment to the other of said pipe sections including manually adjustable means for contacting the exterior of said one pipe section and for adjusting the axial position of said one pipe section relative to said other pipe section, and manually operable means connecting said first and second clamp means for pulling said first and second clamp means and said first and second pipe sections toward each other.

2. Apparatus as in claim 1, wherein said pulling means includes a plurality of rod members threaded at both ends and a plurality of nuts each engaging the threads at an end of one of said rod members and wherein each of said clamping means includes a clamping member having a plurality of passages for each receiving a rod member so that said rod members extend parallel to the axes of said pipe sections attached to said clamping means and so that said clamping members can be pulled together by manual rotation of said nuts engaging said threads on the ends of said rod members.

3. Apparatus as in claim 2, wherein said second clamping means includes a further clamping member having a plurality of threaded passages and said contacting means includes a plurality of threaded bolt members each engaging and passing through one of said threaded passages to contact the exterior surface of said other pipe section so that said pipe sections can be aligned by manually moving said bolt members toward and away from said other pipe section.

4. Apparatus as in claim 2, wherein said clamping members each include first and second arcuate members and means for connecting together said arcuate members.

* * * * *